United States Patent
Shim

(10) Patent No.: US 9,231,407 B2
(45) Date of Patent: Jan. 5, 2016

(54) BATTERY SYSTEM, METHOD OF CONTROLLING THE SAME, AND ENERGY STORAGE SYSTEM INCLUDING THE BATTERY SYSTEM

(75) Inventor: Kyung-Sub Shim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 620 days.

(21) Appl. No.: 13/612,315

(22) Filed: Sep. 12, 2012

(65) Prior Publication Data

US 2013/0293020 A1     Nov. 7, 2013

Related U.S. Application Data

(60) Provisional application No. 61/643,498, filed on May 7, 2012.

(51) Int. Cl.
  H02J 7/00    (2006.01)
  H02J 3/32    (2006.01)
  H02J 7/34    (2006.01)

(52) U.S. Cl.
  CPC ... H02J 3/32 (2013.01); H02J 7/34 (2013.01); Y10T 307/658 (2015.04)

(58) Field of Classification Search
  CPC ... B60L 3/004; B60L 3/0069; B60L 11/1866; B60L 2240/547; B60L 2240/545; B60L 2240/549; G01R 31/3658; G01R 31/362; Y02T 10/7061; Y02T 10/7005; H02J 7/00; H02J 3/32; H02J 7/34; H02J 7/21; H02J 7/22

USPC .................................................. 320/116, 118
See application file for complete search history.

(56) References Cited

U.S. PATENT DOCUMENTS

| | | | |
|---|---|---|---|
| 6,472,880 B1* | 10/2002 | Kang | ............................ 324/434 |
| 7,782,016 B2 | 8/2010 | Kang et al. | |
| 8,129,997 B2 | 3/2012 | Heo et al. | |
| 2010/0026308 A1 | 2/2010 | Jeon et al. | |
| 2010/0271035 A1 | 10/2010 | Heo et al. | |
| 2010/0321026 A1 | 12/2010 | Matsuura et al. | |
| 2011/0204898 A1 | 8/2011 | Kim et al. | |
| 2011/0210747 A1 | 9/2011 | Heo et al. | |

FOREIGN PATENT DOCUMENTS

| | | |
|---|---|---|
| JP | 2007-240299 | 9/2007 |
| KR | 10-2007-0083173 | 8/2007 |
| KR | 10-2010-0052417 | 5/2010 |
| KR | 10-2010-0061395 | 6/2010 |

* cited by examiner

*Primary Examiner* — Vuthe Siek
(74) *Attorney, Agent, or Firm* — Robert E. Bushnell, Esq.

(57) ABSTRACT

A battery management system used to monitor a number of batteries. This battery management system includes a number of isolation circuits electrically connected to the batteries. The battery management system includes a measuring unit electrically connected to the isolation circuits to turn on or off the isolation circuits and measure voltages simultaneously of the batteries when the isolation circuits are turned on by the measuring unit.

17 Claims, 5 Drawing Sheets

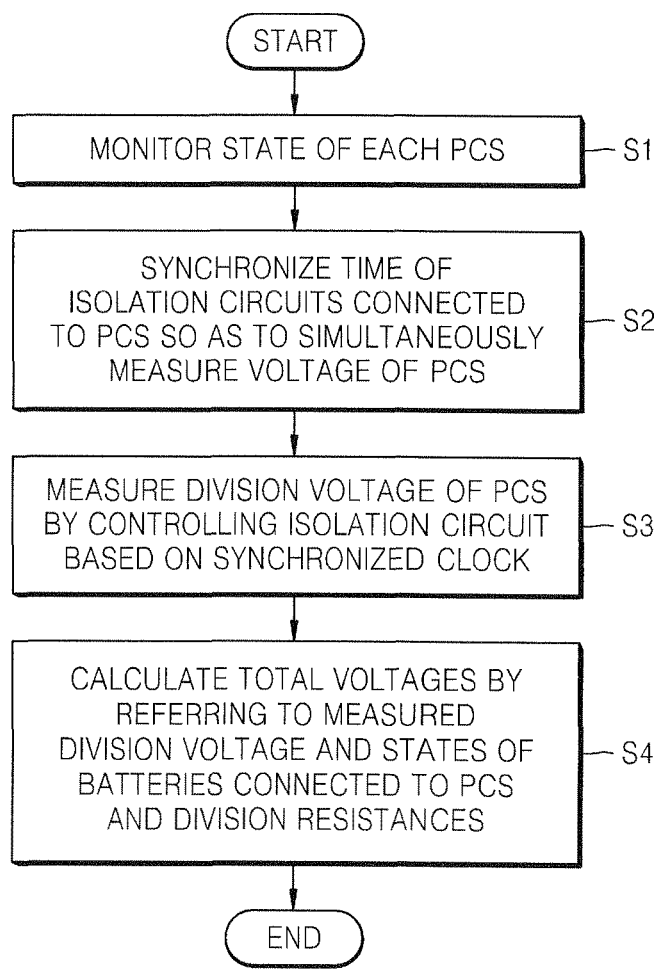

BATTERY SYSTEM, METHOD OF CONTROLLING THE SAME, AND ENERGY STORAGE SYSTEM INCLUDING THE BATTERY SYSTEM

CLAIM OF PRIORITY

This application claims priority to and the benefit of Provisional Application No. 61/643,498, filed on 7 May 2012, in The United States Patent and Trademark Office, the entire content of which is incorporated herein by reference.

BACKGROUND OF THE INVENTION

1. Field of the Invention

The present invention generally relates to a battery system.

2. Description of Related Art

As problems, such as environmental contamination and resource exhaustion, increase, interest in systems for storing energy and efficiently using the stored energy also increase. There is also increased interest in renewable energy that does not cause pollution during power generation. Thus, research into energy storage systems, which may be used with renewable energy, a power storage battery system, and existing grid power, has been actively conducted as changes occur in the environment.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a plurality of battery system including a plurality of batteries, wherein each total voltages of battery system may be measured simultaneously, a method of controlling the battery system, and an energy storage system including the battery system.

According to aspects of the present invention a battery management system is provided to monitor a plurality of batteries. This battery management system includes a plurality of isolation circuit units electrically connected to the plurality of batteries. A measuring unit is electrically connected to the plurality of isolation circuit units to turn on or off the plurality of isolation circuit units and measure voltages simultaneously of the plurality of batteries when the plurality of isolation circuit units are turned on by the measuring unit.

The plurality of isolation circuit units may be synchronized at a synchronized time such that the voltages of the plurality of batteries are simultaneously measured.

The battery management system may further include a plurality of resistance division units each electrically connected between one of the plurality of isolation units and the measuring unit.

Further, when the plurality of isolation circuit units are turned off, the plurality of batteries and the plurality of resistance division units are isolated from each other, and no voltage is applied to said plurality of resistance division units, and the measuring unit may not measure said voltages.

Still further, when the plurality of isolation circuit units are turned on, the plurality of batteries and the plurality of resistance division units may be electrically connected to each other, and voltage may be applied to the plurality of resistance division units, and the measuring unit may measure the voltages.

The plurality of resistance division units may include a plurality of resistors that may divide voltages of each of the plurality of batteries for the measuring unit to measure the divided voltages.

The battery management system may further include a plurality of condenser units each electrically connected between corresponding ones of the plurality of resistance division units and the measuring unit.

The plurality of condenser units may each respectively measure voltages of each of the plurality of batteries that the measuring unit uses to determine capacity charges of the plurality of batteries.

Further each of the plurality of isolation circuit units may further include at least one switch, in which this switch may be a level shift circuit in a switching device, an optical isolator, a solid state relay, a photoMOS relay, or a photocoupler.

Another aspect of the invention includes the measuring unit further having or possibly including: a plurality of isolation circuit control terminals; a plurality of voltage measurement reference terminals; and a plurality of voltage measurement terminals. The measuring unit may obtain the voltages of the plurality of batteries based on a potential between the plurality of voltage measurement reference terminals and the plurality of voltage measurement terminals.

Further, the measuring unit may also include a monitoring unit; a control unit; a time synchronizing unit; an isolation circuit control unit to control an operation of the plurality of isolation circuit units; and a voltage measuring unit measures the voltages of the plurality of batteries when the plurality of isolation circuit units are turned on by the isolation circuit control unit.

The monitoring unit may measure temperature, voltage, and current of the plurality of batteries and calculates an amount of storable energy available for transmission to a load.

Still further the time synchronizing unit may generate exact time information via a real time clock and operates both when the measuring unit is turned on or off.

The time synchronizing unit may use the exact time information to determine when said voltages of the plurality of batteries are to be determined by the measuring unit.

Another aspect of the invention involves the battery management system and the plurality of batteries being part of an energy storage system. This energy storage system may include a power conversion system (PCS) electrically connected to the plurality of batteries and the battery management system; a power generation system electrically connected to the energy storage system supplying electrical power to the energy storage system; a grid to receive electrical power from the energy storage system and supply electrical power to the energy storage system; and a load electrically connected to the energy storage system to receive electrical power from the energy storage system.

The PCS may further include a power converting unit electrically connected to the power generation system to convert electric power received from the power generation system from alternating current (AC) to direct current (DC); a direct current (DC) link unit electrically connected to the power converting unit and an inverter; a converter electrically connected to the plurality of batteries, the power converting unit and the DC link unit to perform DC-DC conversion by converting a voltage of power output from the power converting unit or the inverter into a voltage level required by the plurality of batteries; and an integrated controller electrically connected to the power converting unit, the converter, the DC link unit, the inverter, the load and the grid to monitor a state of the power generation system, the grid, the plurality of batteries, and the load.

The energy storage system may also have a first and second switch electrically connected in series between the inverter and the grid, and said first and second switch electrically connected to the integrated controller. The integrated controller may turn on or off the first and second switch to control the flow of current between the power generation system and the grid.

The energy storage system may further include a protection circuit electrically connected between the PCS and at least one of the plurality of batteries to prevent overcharging or overdischarging of the plurality of batteries.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a flowchart illustrating a method of operating a battery system according to an embodiment of the present invention.

DETAILED DESCRIPTION OF THE INVENTION

Figure 1:
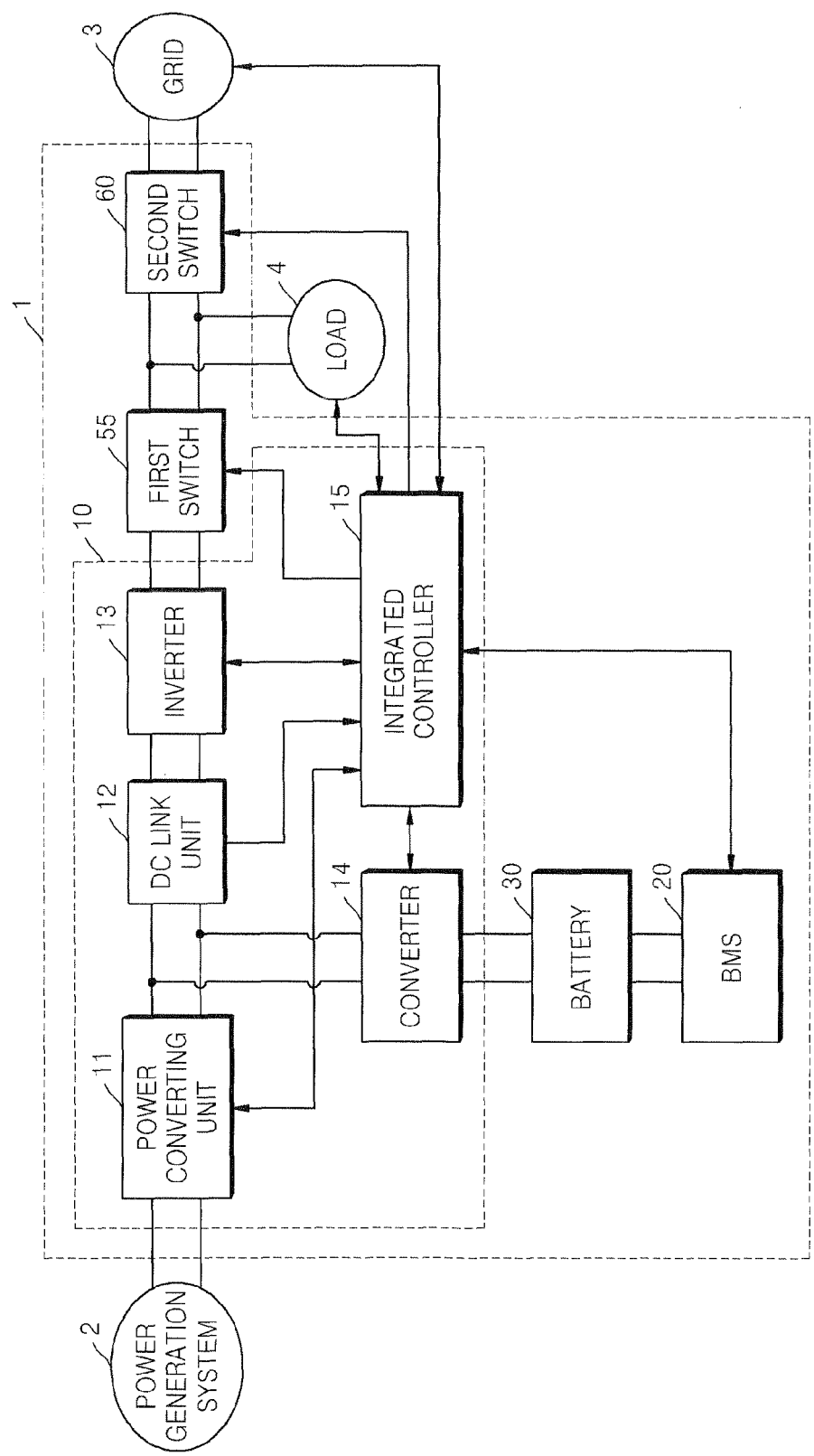
FIG. 1 is a block diagram illustrating an energy storage system according to an embodiment of the present invention.

The present invention will now be described more fully with reference to the accompanying drawings, in which exemplary embodiments of the invention are shown. The embodiments will be described in detail such that one of ordinary skill in the art may easily work the present invention. It should be understood that the embodiments of the present invention may vary but do not have to be mutually exclusive. For example, particular shapes, structures, and properties according to a predetermined embodiment described in this specification may be modified in other embodiments without departing from the spirit and scope of the prevent invention. In addition, positions or arrangement of individual components of each of the embodiments may also be modified without departing from the spirit and scope of the present invention. Accordingly, the detailed description below should not be construed as having limited meanings but construed to encompass the scope of the claims and any equivalent ranges thereto. In the drawings, like reference numerals denote like elements in various aspects.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, the present invention will now be described more fully with reference to the accompanying drawings, in which exemplary embodiments of the present invention are shown such that one of ordinary skill in the art may easily work the invention.

For the energy storage systems, efficient management of batteries is one of the important issues. Batteries are to be controlled in regard to various features such as charging, discharging, or cell balancing. By efficiently controlling the batteries, the lifespan of the batteries may be increased, and power may be stably supplied to a load.

FIG. 1 is a block diagram of an energy storage system 1 according to an embodiment of the present invention.

Referring to FIG. 1, the energy storage system 1 is used with a power generation system 2 and a grid 3 to supply power to a load 4.

The power generation system 2 generates power by using an energy source and supplies the power to the energy storage system 1. Examples of the power generation system 2 may include any power systems that generate power using renewable energy such as a solar power generation system, a wind power generation system, or a tidal power generation system.

The grid 3 may include a power plant, a substation, power lines, and the like. The grid 3 may supply power to the energy storage system 1 so as to supply power to the load 4 and/or a battery 30. Alternatively, the grid 3 may receive power from the energy storage system 1.

The load 4 consumes power generated by the power generation system 2, power stored in the battery 30, or power supplied from the grid 3. A house or a factory may be an example of the load 4.

The energy storage system 1 may store power generated by the power generation system 2 in the battery 30, and supply the generated power to the grid 3. The energy storage system 1 may supply power stored in the battery 30 to the grid 3, or store power supplied from the grid 3 in the battery 30. If there is a power failure in the grid 3, the energy storage system 1 may perform an uninterruptible power supply (UPS) operation.

The energy storage system 1 may include a power conversion system (PCS) 10 that controls power conversion, a battery management system (BMS) 20, a battery 30, a first switch 55, a second switch 60, etc.

The PCS 10 may convert power of the power generation system 2, the grid 3, and the battery 30 into suitable power and supplies the converted power to where needed. The PCS 10 includes a power converting unit 11, a direct current (DC) link unit 12, an inverter 13, a converter 14, and an integrated controller 15.

The power converting unit 11 is connected between the power generation system 2 and the DC link unit 12. The power converting unit 11 delivers power generated by the power generation system 2 to the DC link unit 12. At this time, an output voltage of power output from the power converting unit 11 may be converted into a DC link voltage.

The power converting unit 11 may include a converter, a rectifier circuit, or the like, according to the type of the power generation system 2. If the power generation system 2 generates DC power, the power converting unit 11 may include a converter for converting the DC power to DC power. If the power generation system 2 generates alternating current (AC) power, the power converting unit 11 may include a rectifier circuit for converting the AC power to DC power. In particular, if the power generation system 2 is a solar power generation system, the power converting unit 11 may include a maximum power point tracking (MPPT) converter so as to obtain maximum power output from the power generation system 2 according to a change in solar radiation, temperature, or the like.

The DC link unit 12 is connected between the power converting unit 11 and the inverter 13. The DC link unit 12 prevents an instantaneous voltage drop of the power generation system 2 or the grid 3 and generation of a peak load in the load 40 so as to maintain a stable DC link voltage.

The inverter 13 is a power converter connected between the DC link unit 12 and the first switch 55. The inverter 13 may include an inverter that converts the DC link voltage output from the power generation system 2 and/or the battery 30 into an AC voltage of the grid 3 and outputs the AC voltage in a discharging mode. The inverter 13 may rectify an AC voltage output from the grid 3 into the DC link voltage and output the same to be stored in the battery 30 in a charging mode. The inverter 13 may be a bidirectional inverter in which directions of input and output are changeable. Alternatively, the inverter 13 may include a plurality of inverters.

The inverter 13 may include a filter for removing harmonics from the AC voltage output to the grid 3, and a phase-locked loop (PLL) circuit for matching a phase of the AC voltage output from the inverter 13 to a phase of the AC voltage of the grid 3. Also, the inverter 13 may perform other functions such as restriction of voltage variation range, power factor correction, removal of DC components, and protection of transient phenomenon.

The converter 14 performs DC-DC conversion by converting a voltage of power output from the battery 30 into a voltage level required by the inverter 13, i.e., the DC link voltage and outputs the same in a discharging mode. Also, the converter 14 performs DC-DC conversion by converting a voltage of power output from the power converting unit 11 or the inverter 13 into a voltage level required by the battery 30, i.e., a charge voltage in a charging mode. The converter 14 may be a bidirectional converter in which directions of input and output are changeable. Alternatively, the converter 14 may include a plurality of converters.

The integrated controller 15 monitors states of the power generation system 2, the grid 3, the battery 30, and the load 4, and controls the power converting unit 11, the inverter 13, the converter 14, the first switch 55, the second switch 60, and the BMS 20 according to results of the monitoring. The integrated controller 15 may monitor whether a power failure occurs in the grid 3, whether the power generation system 2 generates power, an amount of power generated by the power generation system 2, a charge state of the battery 30, an amount of power consumed by the load 4, time, and the like.

The first switch 55 and the second switch 60 are connected in series between the inverter 13 and the grid 3, and control the flow of current between the power generation system 2 and the grid 3 by being turned on or off under the control of the integrated controller 15. The first switch 55 and the second switch 60 may be turned on or off according to states of the power generation system 2, the grid 3, and the battery 30. For example, if a large amount of power is required by the load 40, the first switch 55 and the second switch 60 are both turned on so that all power of the power generation system 2 and the grid 3 may be used. However, if the power of the power generation system 2 and the grid 3 is insufficient to satisfy the required amount of power by the load 4, power stored in the battery 30 may be supplied to the load. If there is a power failure in the grid 3, the second switch 60 is turned off and the first switch 55 is turned on. Accordingly, power from the power generation system 2 and/or the battery 30 may be supplied to the load 4, but may not flow into the grid 3, which prevents the energy storage system 1 from operating solely, thereby preventing a worker who works at a power distribution line of the grid 3 or the like from getting an electric shock.

The BMS 20 is connected to the battery 30 and controls charging and discharging of the battery 30 according to a control of the integrated controller 15. The BMS 20 may prevent overcharging, over-discharging, over-current, over-voltage, or over-heating, or the like. To this end, the BMS 20 may monitor a voltage, a current, a temperature, a remaining power amount, a lifespan, a charging state, or the like, and may transmit a monitoring result to the integrated controller 15. In addition, according the current embodiment of the present invention, the BMS 20 may simultaneously measure a voltage of the battery 30 respectively connected to the plurality of PCSs 10. The BMS 20 may synchronize voltage measurement time in order to simultaneously measure the voltage of the battery 30, which will be described in detail below.

The battery 30 receives power generated by the power generation system 2 or power of the grid 3 and stores the same, and supplies the power stored in the load 4 or the grid 3.

The battery 30 may include at least one battery rack or a plurality of battery racks that are connected serially and/or parallel. A battery rack refers to a sub-component of the battery 30. In addition, each battery rack may include at least one battery tray or a plurality of battery trays that are connected serially and/or parallel. A battery tray refers to a sub-component of the battery rack. Also, each batter tray may include a plurality of battery cells. The battery 30 may be formed of various types of battery cells such as a nickel-cadmium battery, a lead storage battery, a NiMH: nickel metal hydride (NoMH) battery, a lithium ion battery, or a lithium polymer battery.

Figure 2:
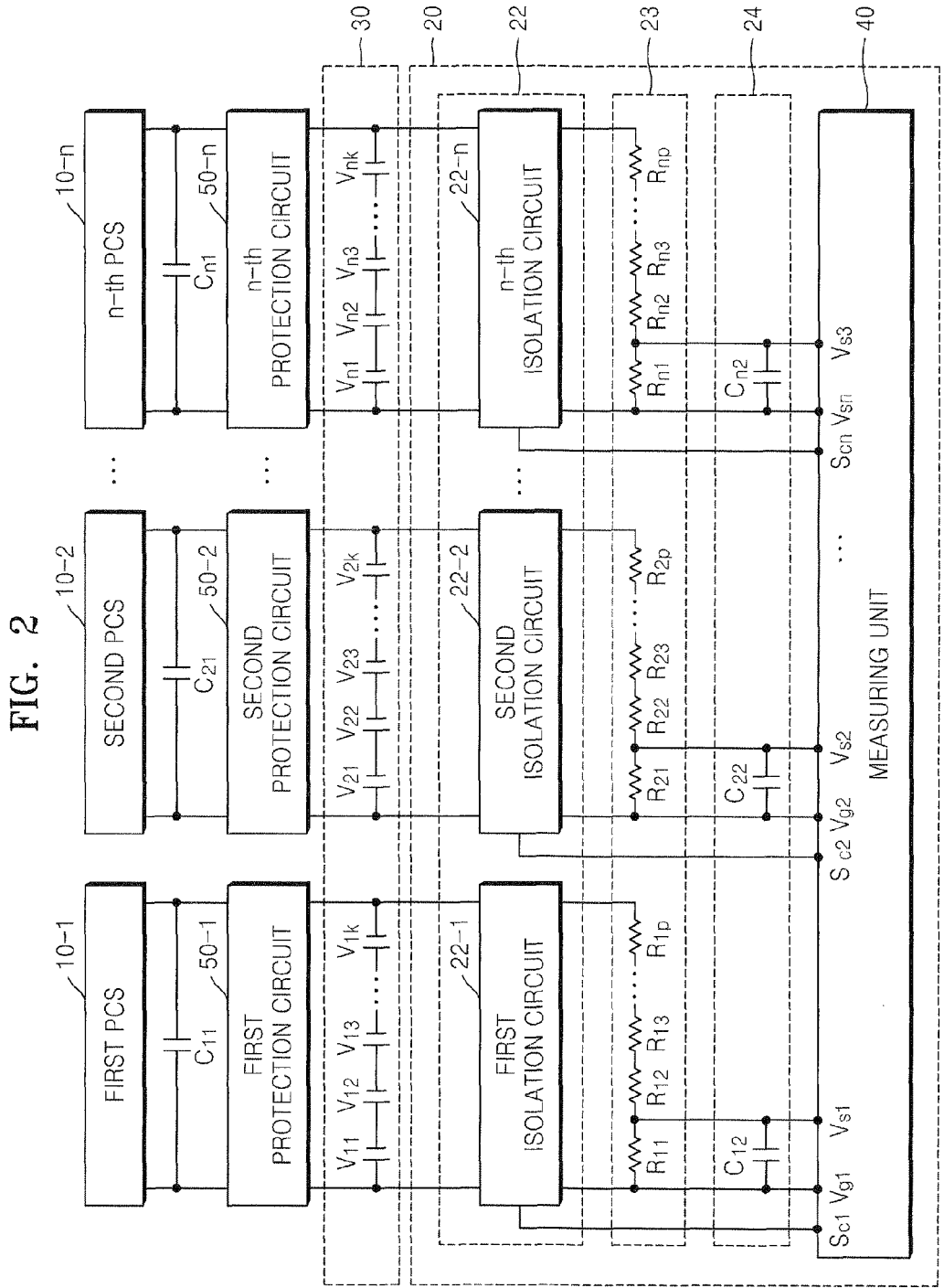
FIG. 2 illustrates a power conversion system (PCS) contained with the energy storage system illustrated in FIG. 1 according to an embodiment of the present invention.

FIG. 2 illustrates a plurality of power conversion systems (PCSs) included in an energy storage system 1 according to an embodiment of the present invention.

According to the current embodiment of the present invention, a plurality of PCSs 10 may be included in the energy storage system 1. That is, referring to FIGS. 1 and 2, a plurality of PCSs 10 may be included in one energy storage system 1.

For example, according to FIG. 2, when n PCSs 10 are included, a battery 30 may be connected to each of the PCSs 10, that is, a first PCS 10-1, a second PCS 10-2, ..., and an n-th PCS 10-n. A protection circuit 50 may be included between each pair of the PCSs 10 and the each pair of batteries 30. The protection circuit 50 may include a fuse (not shown) that is capable of blocking a charging or discharging path between the batteries 30 and the PCSs 10. The fuse included in the protection circuit 50 protects the battery cells by fusing the charging or discharging path connected from the PCSs 10 to the batteries 30 when the BMS 20 senses overcharge or overdischarge of each of the batteries 30. That is, the protection circuit 50 may prevent overcharging and overdischarging of the batteries 30.

The number of batteries 30 correspond to the number of PCSs 10. The batteries 30, that is, first batteries V11, V12, ..., and V1k, second batteries V21, V22, ..., and V2k, ..., and n-th batteries Vn1, Vn2, ..., and Vnk, may supply power to corresponding PCSs 110. For example, as illustrated in FIG. 2, according to the current embodiment of the present invention, the first PCS 10-1 may be connected to the first batteries V11, V12, ..., and V1k.

Further, referring to FIG. 2, when a plurality of PCSs 10 and a plurality of batteries 30 are included, the BMS 20 may control the plurality of batteries 30. Since the BMS 20 may control the plurality of batteries 30, voltages of the plurality of PCSs 10 may be simultaneously measured or the batteries 30 may be charged or discharged simultaneously.

Figure 3:
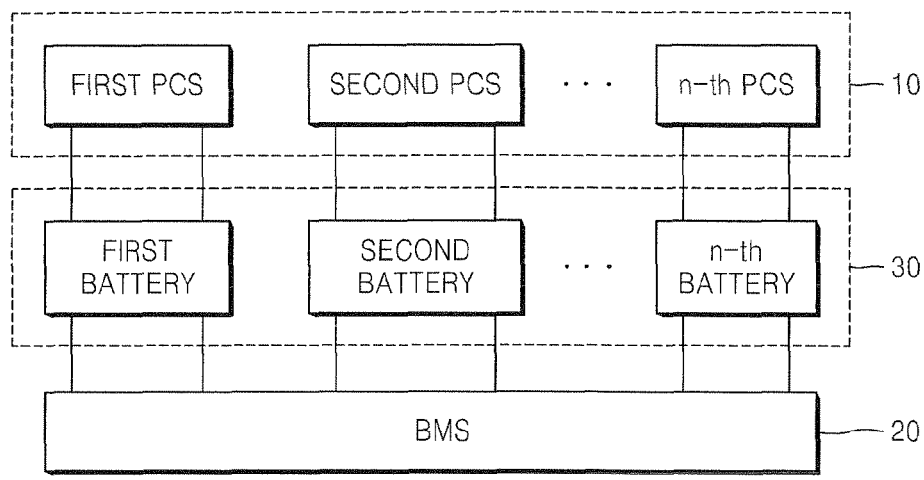
FIG. 3 is a schematic block diagram illustrating a battery system illustrated in FIG. 2 according to an embodiment of the present invention.

FIG. 3 is a schematic block diagram illustrating FIG. 2 according to an embodiment of the present invention.

First, the BMS 20 of FIG. 3 may control the plurality of batteries 30 connected to the plurality of PCSs 10 as described above with reference to FIG. 2. That is, as illustrated in FIG. 3, two ends of the first batteries V11, V12, ..., and V1k, the second batteries V21, V22, ..., and V2k, ..., and the n-th batteries Vn1, Vn2, ..., and Vnk respectively corresponding to n PCSs 10 are connected to the BMS 20. While not illustrated in FIG. 3, the protection circuit 50 may be connected between the plurality of PCSs 10 and the plurality of batteries 30 to prevent overcharging or overdischarging of the plurality of batteries 30.

In addition, while the numbers of first batteries V11, V12, ..., and V1k, second batteries V21, V22, ..., and V2k, ..., and n-th batteries Vn1, Vn2, ..., and Vnk respectively connected to the PCSs 10 are all the same in FIG. 2, that is, k, this is for convenience of description, and the numbers of batteries are not limited to as illustrated in FIG. 2. In addition, the batteries 30 may be not only battery cells but also battery modules, and the number of sub-battery cells V11, V12, ..., Vnk−1, and Vnk constituting each battery module is not limited.

Also, referring to FIG. 2, the BMS 20 may include an isolation circuit unit 22, a resistance division unit 23, a condenser unit 24, and a measuring unit 40.

The isolation circuit unit 22 is a current transfer path between the batteries 30 and the resistance division unit 23, which is to be described later. The isolation circuit unit 22 allows a current to flow between the batteries 30 and the resistance division unit 23 when a voltage of the batteries 30 is measured using a control signal of the measuring unit 40; if a voltage is not measured, the isolation circuit unit 22 insulates the batteries 30 and the resistance division unit 23 from each other so that a noise signal is not transmitted to the BMS 20 even if a large current flows in the energy storage system 1.

If the resistance division unit 23 is directly connected to the batteries 30 without using the isolation circuit unit 22 in order to measure voltages of the batteries 30, results of voltage measurement may vary due to a noise signal generated in the batteries 30 due to a high current value.

In detail, individual isolation circuits of the isolation circuit unit 22 may be respectively electrically connected to the batteries 30. That is, a first isolation circuit 22-1 may be connected to the first batteries V11, V12, ..., and V1k, and an n-th isolation circuit 22-n may be connected to the n-th batteries Vn1, Vn2, ..., and Vnk, and the respective isolation circuits insulate the batteries 30 and the resistance division unit 23 from each other. In addition, when measuring voltages of the first batteries V11, V12, ..., and V1k, the second batteries V21, V22, ..., and V2k, ..., and the n-th batteries Vn1, Vn2, ..., and Vnk respectively connected to the PCSs 10-1, 10-2, ..., and 10-n, the isolation circuit unit 22 may insulate the batteries 30 and the resistance division unit 23 according to a synchronized time such that voltages of the batteries 30 may be simultaneously measured.

In general, in a resistance division circuit according to the related art, an instantaneous total voltage applied to the PCSs 10-1, 10-2, ..., and 10-n is measured. However, in order to instantaneously measure total voltages of the batteries 30 applied to the PCSs 10-1, 10-2, ..., and 10-n, the isolation circuit unit 22 is to be controlled so as to simultaneously measure the total voltages of the each of the PCSs 10-1, 10-2, ..., and 10-n.

As the isolation circuit unit 22, an isolating device functioning as a switch is used. Various circuits such as a level shift circuit in a switching device and an optical isolator may be used as the isolating device. In detail, a solid state relay such as a photoMOS relay or a photocoupler may be used in an isolation circuit to insulate the batteries 30 and the resistance division unit 23. The isolating device may be turned on or off.

The resistance division unit 23 is a circuit used to divide total voltages of the each PCSs 10-1, 10-2, ..., and 10-n at a predetermined rate and measure the same. According to the current embodiment of the present invention, for the BMS 20 to control a high voltage battery system, a total battery voltage is to be measured. A total voltage of a battery pack that is to be measured in the battery system of the energy storage system 1 or a total voltage of the battery system is a high voltage. Thus, a measuring equipment having a high limit is to be included in order to measure the total voltages of the batteries 30. However, according to the current embodiment of the present invention, instead, the total voltages of the each PCSs 10-1, 10-2, ..., and 10-n are divided at a predetermined rate and the divided values are measured, and then the measured voltages are multiplied again by a predetermined rate to calculate the total voltages of the each PCSs 10-1, 10-2, ..., and 10-n.

The resistance division unit 23 may be resistance devices R11, R12, ..., and Rnp or transistors. While the voltage resistance division unit 23 of FIG. 2 includes only resistances, the type and number of elements of the voltage resistance division unit 23 are not limited to the resistances as described above.

The resistance division unit 23 may include first resistances R11, R12, ..., and R1p, second resistances R21, R22, ..., and R2p, ..., and n-th resistances Rn1, Rn2, ..., and Rnp in order to divide voltages of the batteries 30 connected to the plurality of PCSs 10 and measure the divided voltages. The first resistances R11, R12, ..., and R1p, the second resistances R21, R22, ..., and R2p, ..., and the n-th resistances Rn1, Rn2, ..., and Rnp are respectively connected to the first isolation circuit 22-1, the second isolation circuit 22-2, ..., and the n-th isolation circuit 22-n in parallel. For example, when measuring voltages of the first batteries V11, V12, ..., and V1k connected to the first PCS 10-1, the first batteries V11, V12, ..., and V1k are connected to the first resistances R11, R12, ..., and R1p when the first isolation circuit 22-1 is turned on. The measuring unit 40 measures a voltage applied to the first division resistance R11 among the first resistances R11, R12, ..., and Rip to calculate the voltages of all the first batteries V11, V12, ..., and V1k.

A division voltage measured using the measuring unit 40 does not have to be a voltage applied to a resistance as illustrated in FIG. 2 but may be a division voltage that is applied to a plurality of resistances or transistors that divide voltages of the first batteries V11, V12, ..., and V1k, the second batteries V21, V22, ..., and V2k, ..., and the n-th batteries Vn1, Vn2, ..., and Vnk at a predetermined rate as required by the BMS 20.

Next, the condenser unit 24 may be used to measure a voltage applied to a resistance of each of division circuits of the division circuit unit 23. The condenser unit 24 may include a plurality of condensers C12, C22, ..., and Cn2. The plurality of condensers may be used to respectively measure voltages of the first batteries V11, V12, ..., and V1k, the second batteries V21, V22, ..., and V2k, ..., and the n-th batteries Vn1, Vn2, ..., and Vnk. For example, the condenser C12 used to measure voltages of the first batteries V11, V12, ..., and V1k is charged with a voltage applied to the resistance R11, and the measuring unit 40 measures a capacity charged in the condenser C12 to calculate the voltages of the whole first batteries V11, V12, ..., and V1k.

Next, the measuring unit 40 obtains capacities charged in the condensers C12, C22, ..., Cn2 included in the condenser unit 24, thereby measuring voltages of the first batteries V11, V12, ..., and V1k, the second batteries V21, V22, ..., and V2k, ..., and the n-th batteries Vn1, Vn2, ..., and Vnk connected to the plurality of PCSs 10.

The measuring unit 40 may include isolation circuit control terminals Sc1, Sc2, and Scn, voltage measurement reference terminals Vg1, Vg2, ..., and Vgn, and voltage measurement terminals Vn1, Vn2, ..., and Vnn.

The voltage measurement reference terminals Vg1, Vg2, ..., and Vgn and the voltage measurement terminals Vn1, Vn2, ..., and Vnn are used to measure voltages of the batteries 30. The measuring unit 40 may obtain the voltages of the batteries 30 by using a potential between the voltage measurement reference terminals Vg1, Vg2, ..., and Vgn and the voltage measurement terminals Vn1, Vn2, ..., and Vnn.

In detail, the measuring unit 40 may measure a voltage applied to the division resistance R11 to calculate voltages of the first batteries V11, V12, ..., and V1k. As described above, the voltage applied to the resistance R11 is charged in the condenser C12, and the measuring unit 40 obtains a charging amount charged in the condenser C12 to calculate the voltage applied to the resistance R11. According to the embodiment illustrated in FIG. 3, with a voltage applied to the resistance R11 being V1, total voltages of the first batteries V11, V12, ..., and V1k may be expressed as V1*(R11+R12+ ... +R1p)/R11.

Also, the measuring unit 40 may insulate or connect the batteries 30 and the resistance division unit 23 from or to each other by using the isolation circuit control terminals Sc1, Sc2, ..., and Scn. The isolation circuit control terminals Sc1, Sc2, ..., and Scn may generate a signal that turns on or off corresponding isolation circuits. For example, when the isolation circuit control terminal Sc1 transmits a signal for turning on the first isolation circuit 22-1, a division voltage of the first batteries V11, V12, ..., and V1k is applied to the resistance R11 to measure a potential difference between Vn1 and Vg1 to measure total voltages of the first batteries V11, V12, ..., and V1k.

In detail, the measuring unit 40 may transmit a signal to the isolation circuit control terminals Sc1, Sc2, and Scn so as to simultaneously measure voltages of the first batteries V11, V12, ..., and V1k, the second batteries V21, V22, ..., and V2k, ..., and the n-th batteries Vn1, Vn2, ..., and Vnk. That is, by turning on/off the first isolation circuit 22-1, the second isolation circuit 22-2, ..., and the n-th isolation circuit 22-n, voltages of the first batteries V11, V12, ..., and V1k, the second batteries V21, V22, ..., and V2k, ..., and the n-th batteries Vn1, Vn2, ..., and Vnk may be measured at a synchronized time. To synchronize a measurement time in the measuring unit 40, a real time clock (RTC) or a trigger signal may be used.

Figure 4:
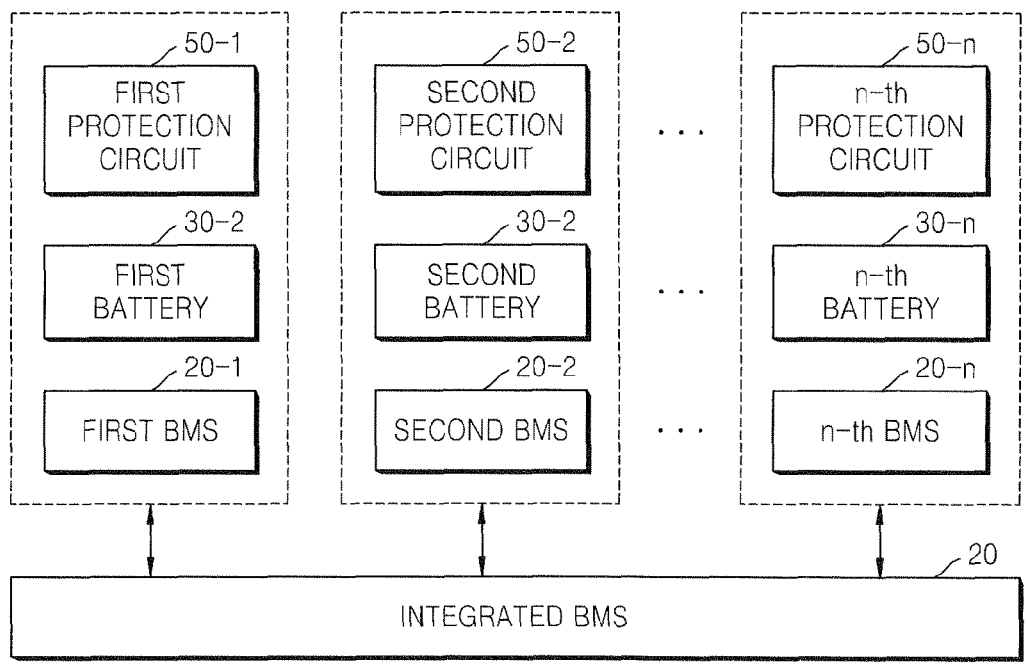
FIG. 4 illustrates a system BMS for controlling individual BMS units according to an embodiment of the present invention.

FIG. 4 illustrates a integrated battery management system (BMS) for controlling individual battery systems according to an embodiment of the present invention.

While the BMS 20 connected and integrated to the individual PCSs 10 may include the measuring unit 40 in the embodiment of FIG. 3, according to the embodiment of FIG. 4, alternatively, the PCSs 10 may be respectively connected to individual BMSs 20-1, 20-2, ..., and 20-n, and the integrated BMS 20 may control the individual BMSs 20-1, 20-2, ..., and 20-n. In this case, the measuring unit 40 may be included in the integrated BMS 20, and the integrated BMS 20 may synchronize times of the individual BMSs 20-1, 20-2, ..., and 20-n and measure voltages. Description of configurations omitted in FIG. 4 compared to FIGS. 2 and 3 may be referred to in the description with reference to FIGS. 2 and 3.

Figure 5:
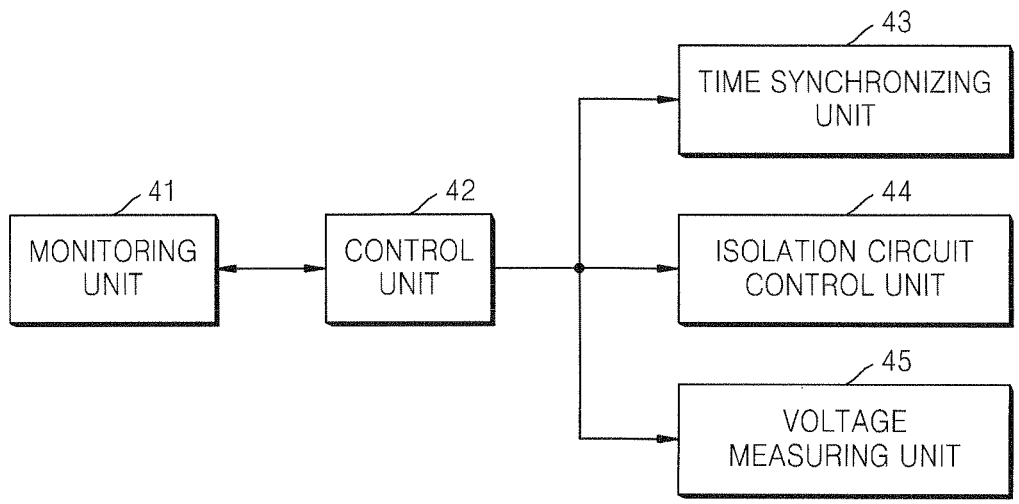
FIG. 5 is a block diagram illustrating an internal structure of a measuring unit according to an embodiment of the present invention.

FIG. 5 is a block diagram illustrating an internal structure of the measuring unit 40 according to an embodiment of the present invention.

Referring to FIG. 5, the measuring unit 40 may include a monitoring unit 41, a control unit 42, a time synchronizing unit 43, an isolation circuit control unit 44, and a voltage measuring unit 45.

First, the monitoring unit 41 monitors a state of the batteries 30. The monitoring unit 41 measures temperature, voltage, current, or the like of the batteries 30, and by using the measured values, the monitoring unit 41 may calculate (estimate) amounts of storable energy or energy amounts that may be transmitted to a motor. The measured values are transmitted to the control unit 42 as state of charge (SOC), state of health (SOH), available discharge power, chargeable power, etc. Since a degree of variation in voltages of the batteries 30 is high when influenced by charging/discharging rates higher than a reference value, voltages are to be measured at appropriate timings. Accordingly, the monitoring unit 41 may monitor the state of the batteries 30 and transmit the monitored state to the control unit 42.

Next, the control unit 42 generates a signal for controlling the overall operation of the measuring unit 40. The control unit 42 determines a present state of the batteries 30 by communicating with the monitoring unit 41, and the time synchronizing unit 43, the isolation circuit control unit 44, and the voltage measuring unit 45 perform respective functions so that a command signal is transmitted.

The time synchronizing unit 43 synchronizes a time signal so that, when the measuring unit 40 measures a voltage of the batteries 30, the measuring unit 40 may simultaneously measure voltages of the first batteries V11, V12, ..., and V1k, the second batteries V21, V22, ..., and V2k, ..., and the n-th batteries Vn1, Vn2, ..., and Vnk. If the batteries 30 are charged or discharged at a charging/discharging rate (c-rate) higher than a reference value in the energy storage system 1, variation in voltages of the batteries 30 according to time is high. Accordingly, in order for the voltages to be measured accurately and instantaneously, when the plurality of batteries 30 are included as in the current embodiment of the present invention, the time synchronizing unit 43 synchronizes a time signal so that voltages of the plurality of batteries 30 are simultaneously measured.

The time synchronizing unit 43 may also operate even when the measuring unit 40 is not turned on according to a real time clock (RTC), thereby generating exact time information. Alternatively, the time synchronizing unit 43 may generate exact time information with which voltages of the batteries 30 may be sensed, by using a trigger signal.

Next, the isolation circuit control unit 44 determines whether to turn on or off the isolation circuit unit 22 according to a signal of the control unit 42. As described above, when the isolation circuit unit 22 is turned on, the batteries 30 and the division circuit unit 23 are connected, and thus the measuring unit 40 may measure division voltages. In contrast, when the isolation circuit unit 22 is turned off, the batteries 30 and the division circuit unit 23 are insulated from each other, and thus no voltage is applied to the division circuit unit 23, and the measuring unit 40 may not be able to measure voltages.

In addition, the isolation circuit control unit 44 may generate a signal for controlling isolating devices such that a noise signal generated in a case where a high current is generated in the battery 30 according to the current embodiment of the present invention, does not affect voltage measurement of the measuring unit 40. In addition, the isolation circuit control unit 44 may generate a command to turn on or off the isolating devices only for a short period of time so that accurate measurement is conducted also when a charging/discharging rate of the battery system of the current embodiment of the present invention is higher than a reference value.

Figure 6:
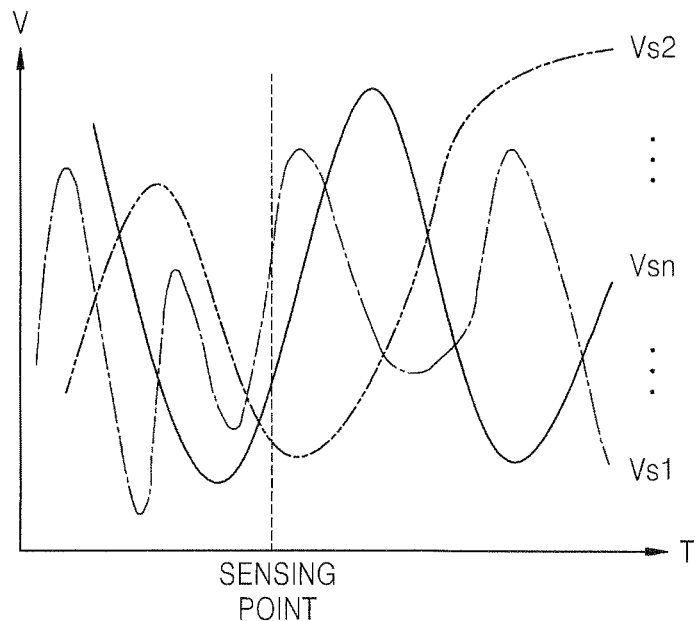
FIG. 6 is a graph showing a variation of a voltage when batteries are charged or discharged at a charging/discharging rate higher than a reference rate.

FIG. 6 is a graph showing a variation in a voltage when batteries are charged or discharged at a charging/discharging rate higher than a reference rate.

As illustrated in FIG. 6, if a rapid variation in voltage is observed in the voltage measurement terminals Vn1, Vn2, ..., and Vnn, and the isolation circuit unit 22 is not included, it is difficult to accurately measure a voltage of a sensing point of FIG. 6 due to the voltage variation. However, when the isolation circuit unit 22 is included to measure voltages of the batteries 30 as in the current embodiment of the present invention, voltages of the batteries 30 may be measured instantaneously by employing the isolating devices. Accordingly, voltages that are sensed using the isolation circuit unit 22 are highly reliable and accurate.

If the first batteries V11, V12, ..., and V1k, the second batteries V21, V22, ..., and V2k, ..., and the n-th batteries Vn1, Vn2, ..., and Vnk show voltage variation as shown in the graph of FIG. 6, the isolation circuit control unit 44 instantaneously turns on the isolation circuit unit 22 only at a sensing point, thereby allowing measurement of each of the first batteries V11, V12, ..., and V1k, the second batteries V21, V22, ..., and V2k, ..., and the n-th batteries Vn1, Vn2, ..., and Vnk.

Next, while the isolation circuits 22-1 through 22-n of the isolation circuit unit 22 are turned on by the isolation circuit control unit 44, the voltage measuring unit 45 measures voltages of the first batteries V11, V12, ..., and V1k, the second batteries V21, V22, ..., and V2k, ..., and the n-th batteries Vn1, Vn2, ..., and Vnk. That is, division voltages of the batteries 30 may be measured by using a potential difference sensed by the first batteries V11, V12, ..., and V1k, the second batteries V21, V22, ..., and V2k, ..., and the n-th batteries Vn1, Vn2, ..., and Vnk.

In addition, the voltage measuring unit 45 measures the total voltages of the first batteries V11, V12, ..., and V1k, the second batteries V21, V22, ..., and V2k, ..., and the n-th batteries Vn1, Vn2, ..., and Vnk based on the measured division voltages. That is, the voltage measuring unit 45 may calculate the total voltages of the batteries 30 in consideration of device characteristics, for example, resistance characteristics based on the measured division voltages.

FIG. 7 is a flowchart illustrating a method of operating a battery system according to an embodiment of the present invention.

Referring to FIG. 7, first, the monitoring unit 41 of the measuring unit 40 monitors a state of the batteries 30 in operation S1. That is, the monitoring unit 41 may monitor a state of the batteries 30, whether the isolation circuit unit 22 is turned on or off, or whether there is a noise signal from the PCSs 10.

Next, in operation S2, time of the isolation circuit unit 22 is synchronized in order to measure voltages of the first batteries V11, V12, ..., and V1k, the second batteries V21, V22, ..., and V2k, ..., and the n-th batteries Vn1, Vn2, ..., and Vnk respectively connected to the plurality of PCSs 10. The time synchronizing unit 43 of the measuring unit 40 may synchronize a signal of the isolation circuit unit 22 using a real time clock (RTC) or a trigger signal.

Next, in operation S3, division voltages of the batteries 30 respectively connected to the PCSs 10 are measured by controlling the isolation circuit unit 22 based on the synchronization clock signal. The measuring unit 40 turns all of the first isolation circuit 22-1, the second isolation circuit 22-2, ..., and the n-th isolation circuit 22-n on at a synchronized time to be measured, thereby measuring the division voltages of the first batteries V11, V12, ..., and V1k, the second batteries V21, V22, ..., and V2k, ..., and the n-th batteries Vn1, Vn2, ..., and Vnk.

Finally, in operation S4, the voltage measuring unit 45 calculates total voltages of the each PCSs 10-1, 10-2, ..., and 10-n by referring to the division voltages measured in operation S3 and a state of a circuit of the resistance division unit 23 connected to the batteries 30.

Thus, even when there are a plurality of PCSs 10, voltages of the batteries 30 connected to the PCSs 10 may be simultaneously measured in the battery system according to the embodiments of the present invention.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery management system to monitor a plurality of batteries, comprising:
    a plurality of isolation circuit units electrically connected to said plurality of batteries;
    a measuring unit electrically connected to the plurality of isolation circuit units to turn on or off the plurality of isolation circuit units and measure voltages simultaneously of said plurality of batteries when the plurality of isolation circuit units are turned on by the measuring unit; and
    a plurality of resistance division units each electrically connected between one of the plurality of isolation units and the measuring unit.

2. The battery management system recited in claim 1, wherein said plurality of isolation circuit units are synchronized at a synchronized time such that said voltages of the plurality of batteries are simultaneously measured.

3. The battery management system recited in claim 2, wherein when the plurality of isolation circuit units are turned off, the plurality of batteries and the plurality of resistance division units are isolated from each other, and no voltage is applied to said plurality of resistance division units, and the measuring unit cannot measure said voltages.

4. The battery management system recited in claim 2, wherein when the plurality of isolation circuit units are turned on, the plurality of batteries and the plurality of resistance division units are electrically connected to each other, and voltage is applied to said plurality of resistance division units, and the measuring unit measures said voltages.

5. The battery management system recited in claim 2, wherein the plurality of resistance division units comprises a plurality of resistors that divide voltages of each of the plurality of batteries for the measuring unit to measure the divided voltages.

6. The battery management system recited in claim 2, further comprising;
   a plurality of condenser units each electrically connected between corresponding ones of the plurality of resistance division units and the measuring unit.

7. The battery management system recited in claim 6, wherein the plurality of condenser units each respectively measure voltages of each of the plurality of batteries that the measuring unit uses to determine capacity charges of the plurality of batteries.

8. The battery management system recited in claim 1, wherein each of the plurality of isolation circuit units comprises at least one switch, said switch is a level shift circuit in a switching device, an optical isolator, a solid state relay, a photoMOS relay, or a photocoupler.

9. The battery management system recited in claim 1, wherein the measuring unit further comprises:
   a plurality of isolation circuit control terminals;
   a plurality of voltage measurement reference terminals; and
   a plurality of voltage measurement terminals,
   wherein said measuring unit obtains the voltages of the plurality of batteries based on a potential between the plurality of voltage measurement reference terminals and the plurality of voltage measurement terminals.

10. The battery management system recited in claim 1, wherein the measuring unit further comprises:
    a monitoring unit;
    a control unit;
    a time synchronizing unit;
    an isolation circuit control unit to control an operation of the plurality of isolation circuit units; and
    a voltage measuring unit measures the voltages of the plurality of batteries when the plurality of isolation circuit units are turned on by the isolation circuit control unit.

11. The battery management system recited in claim 10, wherein the monitoring unit measures temperature, voltage, and current of the plurality of batteries and calculates an amount of storable energy available for transmission to a load.

12. The battery management system recited in claim 10, wherein the time synchronizing unit generates exact time information via a real time clock and operates both when the measuring unit is turned on or off.

13. The battery management system recited in claim 12, wherein the time synchronizing unit uses the exact time information to determine when said voltages of the plurality of batteries are to be determined by the measuring unit.

14. A battery management system to monitor a plurality of batteries, comprising:
    a plurality of isolation circuit units electrically connected to said plurality of batteries; and
    a measuring unit electrically connected to the plurality of isolation circuit units to turn on or off the plurality of isolation circuit units and measure voltages simultaneously of said plurality of batteries when the plurality of isolation circuit units are turned on by the measuring unit;
    wherein the battery management system and the plurality of batteries are part of an energy storage system, said energy storage system comprising:
      a power conversion system (PCS) electrically connected to the plurality of batteries and the battery management system;
      a power generation system electrically connected to the energy storage system supplying electrical power to the energy storage system;
      a grid to receive electrical power from the energy storage system and supply electrical power to the energy storage system; and
      a load electrically connected to the energy storage system to receive electrical power from the energy storage system.

15. The battery management system recited in claim 14, wherein the PCS comprises:
    a power converting unit electrically connected to the power generation system to convert electric power received from the power generation system from alternating current (AC) to direct current (DC);
    a direct current (DC) link unit electrically connected to the power converting unit and an inverter;
    a converter electrically connected to the plurality of batteries, the power converting unit and the DC link unit to perform DC-DC conversion by converting a voltage of power output from the power converting unit or the inverter into a voltage level required by the plurality of batteries; and
    an integrated controller electrically connected to the power converting unit, the converter, the DC link unit, the inverter, the load and the grid to monitor a state of the power generation system, the grid, the plurality of batteries, and the load.

16. The battery management system recited in claim 15, said energy storage system further comprising;
    a first and second switch electrically connected in series between the inverter and the grid, and
    said first and second switch electrically connected to the integrated controller,
    wherein the integrated controller turns on or off the first and second switch to control the flow of current between the power generation system and the grid.

17. The battery management system recited in claim 16, said energy storage system further comprising:
    a protection circuit electrically connected between the PCS and at least one of the plurality of batteries to prevent overcharging or overdischarging of the plurality of batteries.

* * * * *